Figure 1:
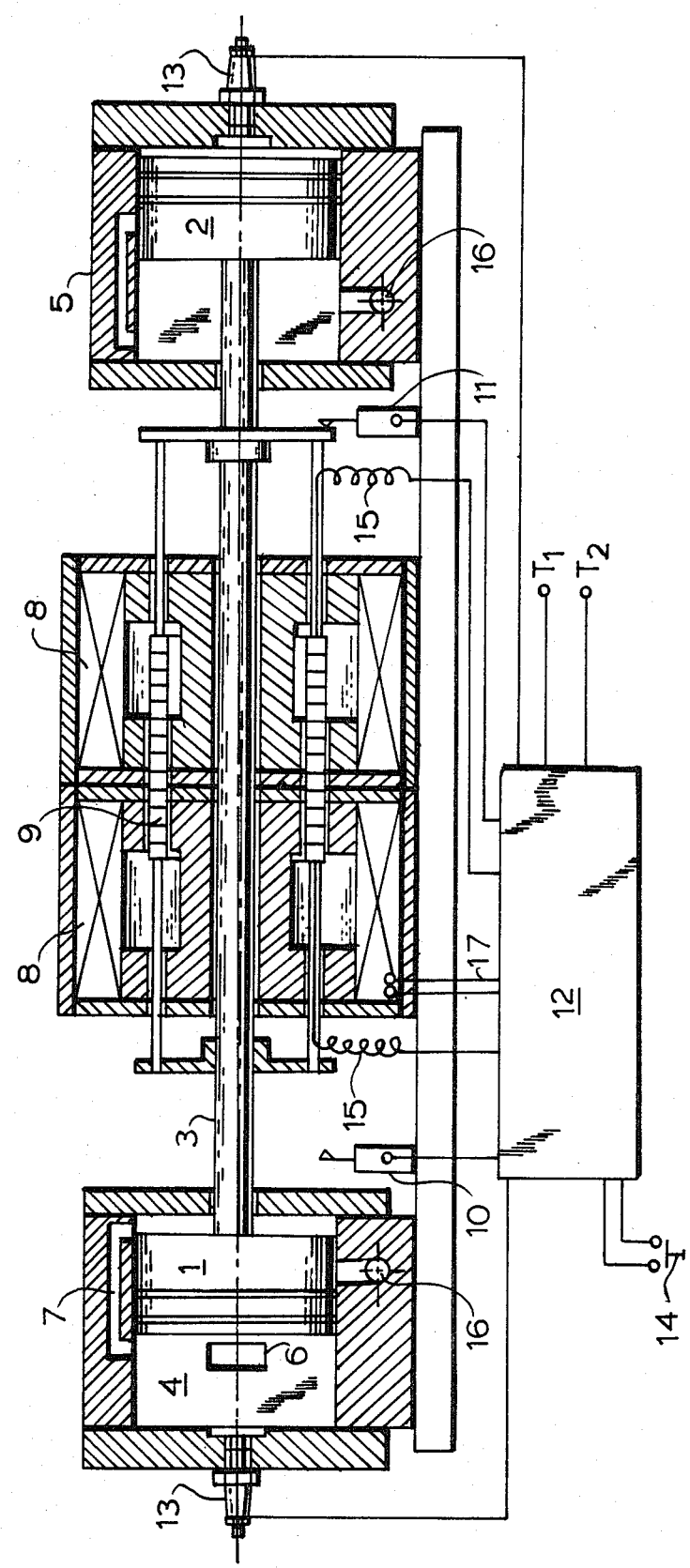

United States Patent [19]

Iliev et al.

[11] Patent Number: 4,532,431
[45] Date of Patent: Jul. 30, 1985

[54] METHOD AND APPARATUS FOR PRODUCING ELECTRICAL ENERGY FROM A CYCLIC COMBUSTION PROCESS UTILIZING COUPLED PISTONS WHICH RECIPROCATE IN UNISON

[75] Inventors: Maxim D. Iliev; Stoyu S. Kervanbashiev; Stefan D. Karamanski; Frederik M. Makedonski, all of Sofia, Bulgaria

[73] Assignee: CUV "Progress", Sofia, Bulgaria

[21] Appl. No.: 431,119

[22] Filed: Sep. 30, 1982

[30] Foreign Application Priority Data

Oct. 2, 1981 [DE] Fed. Rep. of Germany ....... 3139357

[51] Int. Cl.³ .................... F02B 71/00; F02D 39/10; H02P 9/04
[52] U.S. Cl. .................... 290/4 R; 290/1 R; 290/40 R; 60/699; 123/46 R; 123/46 E; 310/15; 310/23; 92/131
[58] Field of Search .................... 290/1 R, 4 R, 40 R, 290/DIG. 1, 1 C, 1 B, 1 A; 123/46 R, 46 E, DIG. 12; 60/699, 721, DIG. 1; 310/15, 23, 27; 92/131

[56] References Cited

U.S. PATENT DOCUMENTS

| | | | |
|---|---|---|---|
| 1,167,366 | 1/1916 | Fessenden | 123/46 E |
| 1,515,933 | 11/1924 | Crowder | 123/46 E |
| 1,544,010 | 6/1925 | Jordan | 123/46 E |
| 1,785,643 | 12/1930 | Noack et al. | 123/46 E |
| 2,334,688 | 11/1943 | Norton | 123/46 E |
| 2,753,465 | 7/1956 | Lepley | 290/4 A |
| 2,829,276 | 4/1958 | Jarrett et al. | 123/46 E |
| 2,899,565 | 8/1959 | Turner | 123/46 E |
| 2,904,701 | 9/1959 | Colgate | 123/46 E |
| 2,966,148 | 12/1960 | Ehrat et al. | 123/46 E |
| 3,024,591 | 3/1962 | Ehrat et al. | 123/46 R X |
| 3,206,664 | 9/1965 | Lilly | 290/4 R |
| 3,234,395 | 2/1966 | Colgate | 290/1 R |
| 3,629,596 | 12/1971 | Wills | 123/46 E X |
| 3,675,031 | 7/1972 | Lavigne | 123/46 E X |
| 3,766,399 | 10/1973 | Demetrescu | 123/46 E |
| 4,154,200 | 5/1979 | Jarrett et al. | 123/46 E X |
| 4,213,428 | 7/1980 | Bradley | 123/46 E |
| 4,249,096 | 3/1981 | Hickox | 290/1 R X |
| 4,270,054 | 5/1981 | Dowd | 290/1 R X |
| 4,342,920 | 8/1982 | Bucknam | 123/46 E X |
| 4,403,153 | 9/1983 | Vallon | 123/46 E |
| 4,439,720 | 3/1984 | Georges | 290/4 R X |

FOREIGN PATENT DOCUMENTS

| | | | |
|---|---|---|---|
| 1108002 | of 0000 | Fed. Rep. of Germany | 123/46 E |
| 2459203 | of 0000 | Fed. Rep. of Germany | 123/46 E |
| 1011664 | 7/1957 | Fed. Rep. of Germany | 123/46 E |
| 1048739 | 1/1959 | Fed. Rep. of Germany | 123/46 E |
| 1093139 | 11/1960 | Fed. Rep. of Germany | 123/46 E |
| 2430503 | 1/1976 | Fed. Rep. of Germany | 123/46 E |
| 2059996 | 12/1977 | Fed. Rep. of Germany | 123/46 E |
| 2755434 | 6/1979 | Fed. Rep. of Germany | 123/46 E |
| 1589483 | of 0000 | France | 123/46 E |
| 1104158 | 11/1955 | France | 123/46 E |
| 2254981 | 7/1975 | France | 123/46 E |
| 879036 | 10/1961 | United Kingdom | 123/46 E |
| 0628325 | 8/1978 | U.S.S.R. | 123/46 E |
| 0826058 | 5/1981 | U.S.S.R. | 123/46 R |

Primary Examiner—A. T. Grimley
Assistant Examiner—Terry Flower

[57] ABSTRACT

Method of and device for producing electric energy from a cyclic combustion process. The device includes two oppositely disposed aligned spark ignited internal combustion engine cylinders axially spaced from each other, means rigidly connecting the pistons so that they reciprocate in unison in their respective cylinders, and a reciprocable electrical linear generator-motor unit driven by said reciprocatory piston system. The generator-motor unit includes a very light coreless (ironless) coil rigidly attached to and reciprocatory with the piston system, the said coil reciprocating through a constant strength magnetic field. The beginning of the combustion process (or cycle) in each combustion chamber takes place at the lowest possible compression ratio sufficient for the initial ignition of the fuel-air mixture, the combustion process proceeding at a diminishing volume under the pressure from the compression- and combustion-forces of the opposite combustion chamber-piston system. The combustion process terminates after some extreme point at an expanding volume, whereby the resulting forces are used for compression in the opposite combustion chamber and there the cycle being repeated, which processes (cycles) are taking place under a positive feed-back relation. Because said feed-back relation is very pronounced, this results in a height velocity and a reciprocating rate of the connected piston system whereby there is induced an electromotive voltage in the coil.

8 Claims, 2 Drawing Figures

METHOD AND APPARATUS FOR PRODUCING ELECTRICAL ENERGY FROM A CYCLIC COMBUSTION PROCESS UTILIZING COUPLED PISTONS WHICH RECIPROCATE IN UNISON

The invention relates to a method of and a device for producing electric energy from a cyclic combustion process; the invention finds application in the supply of stationary and mobile electric energy consumers, and it is particularly suitable for vehicles.

Method and devices are known using cyclic combustion processes for producing mechanical oscillations which are then transformed into electrical energy. A practical application is the known "gas generators", which are high-powered shaftless piston internal combustion engines driving compressors. In order to produce electrical energy, the compressor supplies a high-speed gas turbine which drives a rotary electric generator. These engines independently of the kind of the process used—Diesel or Otto, operate with a limited compression ratio. Such engines have no flywheel, and as a result they do not accumulate energy from the previous cycles for the subsequent cycles, and operate at a low frequency of reciprocation (on the order of 20 Hz), despite operating with small vibrating masses. The attainment of the necessary compression for the realization of a working cycle is carried out by suplementary devices. The piston internal combustion engines of this type also require supplementary devices for their starting and synchronization.

Devices using two directly coupled piston systems are known. The energy is also transmitted to a compressor and thence to a gas turbine. Their rate of reciprocation is low, while their construction, in spite of simplifying the synchronization, is rather complicated. They have a low efficiency factor, and have found only a limited field of application.

Devices producing electrical energy directly from the reciprocation of pistons in internal combustion engines are also known. There are devices with two coupled or uncoupled pistons wherein the pistons represent at the same time armatures of a linear electric generator—permanent magnets or electromagnets with exciting windings (German Pat. DE No. 2459203, U.S. Pat. Nos. 3,234,395 and 3,766,399, French Pat. No. 1,589,483, German Auslegeschrift No. 1108002 and No. 1093139). The reciprocating armatures of the electric generators in these constructions possess great masses, thus causing a diminishing of the rate of reciprocation which on its part requires the furthr augmentation of the mass of the armature; this feed back relationship is very pronounced. As a result, these solutions can be employed only for low power devices due to their very slow speed and by reason of their construction. Besides, in the case of uncoupled pistons, the synchronizing of their movement represents a serious problem, while in the case of coupled pistons it requires the equalizing of their mass and the mass of the armatures connected to them. Further, in the case of engines with coupled pistons, which in general have a low speed, there are needed complicated and heavy equalizers which on their part decrease still more the rate of reciprocation and cause inadmissible losses due to friction, diminishing still more in this manner the initial starting advantages of these solutions. This leads most frequently to the renewed use of a flywheel, while not taking off its entire power in order to achieve starting, continuous operation, equalizing, synchronization and the precise control of the dead points or dead centers of the internal combustion engine. Hence there arises the essential disadvantage of all these constructions, namely: their tendency to stopping or the impossibility of putting them into continuous operation.

Another general drawback of the known devices is that they require the use of high octane and leaded fuels.

The object of this invention is to provide a method of and a device for producing electrical energy from a cyclic combustion process in which the combustion process proceeds at speeds of the pistons considerably higher than in the device of the prior art, as well as at higher compression ratios, and there are used movable parts with small masses and a considerably increased frequency of reciprocation, while making it possible to employ different sorts of fuels including low-caloric and low-octane fuels. In accordance with the invention, control of the combustion process is simplified in order to alleviate the starting of the device, and to ensure stable working conditions, an increased efficiency, an increased usefulness of the entire engine-generator system, as well as a high degree of efficiency of fuel combustion with a reduced release of toxic wastes into the atmosphere.

In accordance with the invention, these objects are achieved by means of a method for producing electrical energy from a cyclic combustion process in which there are employed mechanical rectilinear reciprocating movements of a piston system consisting of two permanently coupled pistons in two oppositely disposed combustion chambers in which there are consecutively carried out a cyclically repeating combustion process initiated by an electrical spark. The combustion process in each combustion chamber begins at the lowest compression ratio that is sufficient for the initial ignition of the fuel-air mixture by the electric spark, then it proceeds at a decreasing volume under the compression forces developed in the opposite combustion chamber, and with the fuel still burning, the combustion process is terminated at an expanding volume during the power stroke of the piston. The kinetic energy of the reciprocating movements of the mobile parts is transformed into electrical energy by inducing electromotive voltage in a coreless coil which reciprocates in a magnetic field immovably fixed with respect to the piston system. The coil while moving thus crosses the magnetic lines of force of the static constant magnetic field. Besides, in order to achieve the initial reciprocation of the piston system, it is possible for the coil to be switched on to a piston driving duty. It is switched over automatically from a generator duty to a driving but when there is a decrease of the rate of reciprocation of the piston system, and is switched from a driving duty to a generator duty upon the restoring of the conditions necessary to continuous operation of the device.

The rate of reciprocation of the piston system is preset and is maintained constant by equalizing the input and the output power.

The method according to the invention is practiced by means of a device consisting of a piston system of two permanently coupled pistons moving in two oppositely disposed combustion chambers. A coil is placed in a constant magnetic field of at least one permanent magnet or one electromagnet. The lengths of the magnet and the coil are so determined that the coil during its movement always stays in the magnetic field. In order to check and control the direction of movement of the pistons and the moments of producing the respective sparks by the two spark plugs, there is provided an electrical control circuit with respective transducers. The current output is realized by an extensible cable fixed in an immovable manner to the ends of the coil. The operation of the device is controlled by an electronic control block.

The advantages of the method and the device according to the invention are that it is possible to operate the device at a high frequency of reciprocation of the piston system (up to over 100 Hz, and permitting the attainment of frequencies on the order of 200–300 Hz at a normal piston stroke). These speeds entail a high linear velocity—circa 20 m/sec, which is on the same order as the propagation speed of the flames in the combustion chambers. Besides, at the end of the compression piston stroke high pressures are reached corresponding to a compression ratio exceeding the characteristic compression ratio in the Diesel process, i.e. on the order of 25 to 1, thus leading to the obtaining of a high thermic efficiency factor. As a result of the high reciprocation rates, the losses due to cooling through the walls of the cylinders are reduced. The ignition at a low compression ratio and the combustion at a diminishing volume lengthens the combustion time and ensures a more complete combustion of the fuel mixture, thus permitting for the same reason the combustion to be carried out with low-octane, non-ethylated and non-cracked fuels without the danger of a detonation type of combustion. Also contributing to this effect is the possibility of regulating over a broad range the ignition point depending on the fuel quantity and the loading of the device.

The reaching of a high pressure at the end of the piston stroke when the greatest part of the fuel mixture has already burned and the short staying time of the hot gases under a high compression and a high temperature lead to a reduction of the toxic components in the exhaust products of combustion including a reduction of the formation of toxic nitrogen oxides. A decisive factor in the attainment of a stable operation of the device with a high linear velocity of movement is the small mass of the moving parts of the device. The high linear speed of the coil movement on its part also leads to a high efficiency factor of the generating process, so that the produced electrical energy possesses a relatively high voltage. The entire engine-generator system possesses a small specific mass.

Figure 2:
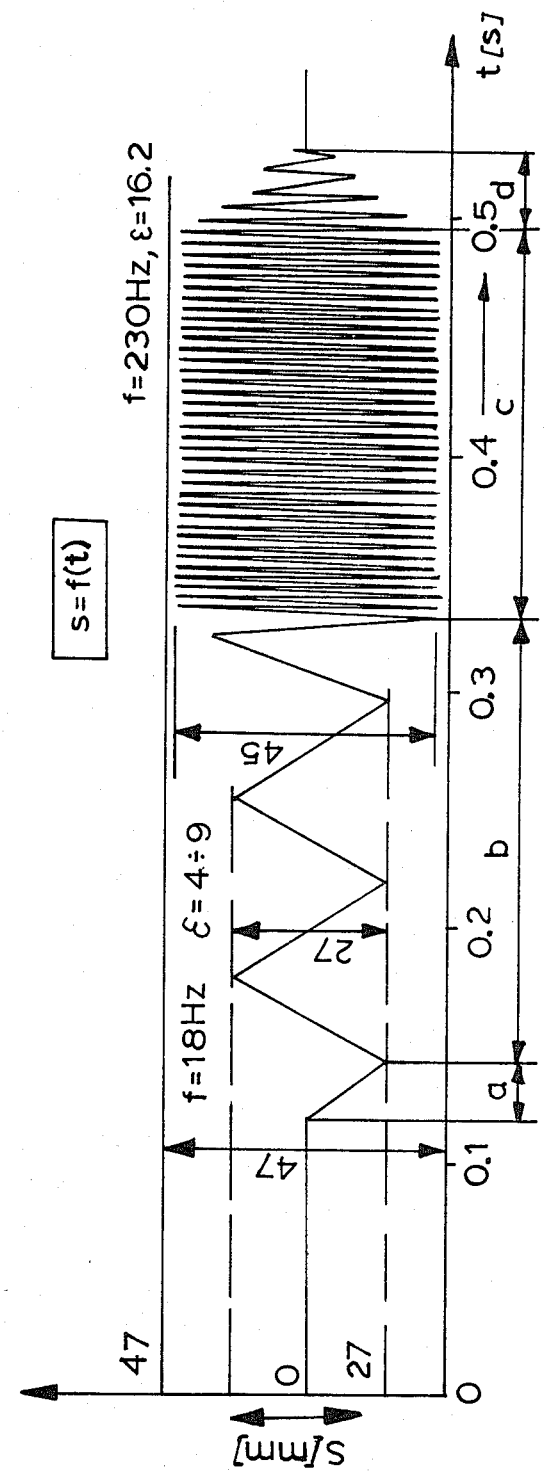

The method and device according to the invention are illustrated and explained in detail by means of a preferred example shown in the accompanying drawings, wherein:

FIG. 1 is a schematic view in axial section of a preferred embodiment of device in accordance with the invention for producing electrical energy from a cyclic combustion process, and FIG. 2 is a graph depicting the amplitude-frequency operation characteristics of such device.

As shown in FIG. 1, the illustrative device according to the invention has a piston system composed of two pistons 1 and 1 permanently coupled by means of a bar 3, two oppositely disposed aligned combustion chambers 4 and 5, each with an intake opening 7 and an exhaust port 6, at least one coreless coil 9 disposed in the constant magnetic field of at least one permanent magnet or electromagnet (in this case two electromagnets 8). The pistons 1 and 2 and the coil 9 are fixed in an immovable way to the bar 3, and all together form a unified reciprocating system. At each end of the coil movement there is disposed a transducer 10, 11 for controlling the movement of the oscillating system, thus determining the motion of the whole system of vibrating parts. In each of the combustion chambers there is mounted at least one ignition plug 13. The operation of the device is controlled by an electronic control block 12 in which there is included a starting pushbutton 14. The coil ends are connected to the controlling block 12 by means of extensible conductors 15. The control block 12 is provided with terminals $T_1$, $T_2$ to which there is connected a power source such as a storage battery (not shown). The magnets 8, which can be connected either in series or in parallel, supplied with current through wires 17.

The initial putting into operation of the device is carried out by means of a starting electrical impulse obtained by closing the starting push-button switch 14. The starting impulse is transmitted to the control block 12 and it causes an unblocking of the respective thyristor, resp. transistor or of two similar elements in the case in which they are placed in the arm of a bridge circuit. At the same time in the control block 12 there is formed a current impulse with a predetermined polarity which is transmitted by the extensible conductors 15 to the coil 9, thus causing a movement of the entire reciprocating system in one of the two directions—left or right. The mean value of the electrodynamic force resulting from the interaction of the current in coil 9 with the magnetic field created by the electromagnets 8 and the counter-electromotive voltage produced by the movement of the piston-coil system is selected so that in the first stroke, denoted by "a" in FIG. 2, the operation of the respective transducer is made possible and the compression in the respective cylinder reaches a ratio of from 4 to 1 to 9 to 1, i.e. at least the value required for the ignition of the given fuel mixture. At the so-selected initial amplitude of reciprocation it is still necessary that the construction ensures a complete or partial opening of the exhaust port 6 and the fuel mixture inlet port 7 in the opposite cylinder. It will be seen that the space beneath or laterally inwardly of each of the pistons is fed with the fuel mixture through a port 16.

The transducers 11 and 10 emit current impulses for the consecutive execution of the following operations at the point of movement corresponding to the selected compression ratio, the starting current in the coil line is interrupted abruptly and a short time afterwards, i.e. after a period which is shorter than the time of movement of the entire reciprocating system, there is produced a spark for ignition; immediately after the beginning of the reverse movement of the vibrating part of the coil 9, there is transmitted a current with a current polarity which is opposite that of the first stroke, or more precisely, the respective thyristor is unblocked, resp. transistor (or two similar electronic elements); such a current runs only in the case when for some reason (for example an incomplete opening of the charging port 7 and hence insufficient filling) no combustion takes place in the cylinder, or the combustion is insufficiently powerful.

If in the first stroke of a given piston no combustion takes place, the reciprocating system returns under the effect of the recoil forces of the compressed but unignited gas in the respective chamber. The transducer 10 resp. 11 reads this reverse movement and causes a current flow having an inverse polarity with respect to the previous current flow. If for some reason no combustion is produced in the second cylinder as well as in the subsequent cycles, some more impulses with a varying polarity follow, causing the subsequent strokes represented in FIG. 2 by the character "b". The forces acting at present upon the reciprocating part are already two: pneumatic and electromagnetic. The latter acts along the twice greater track, i.e. over the whole amplitude determined by the places of both transducers 10 and 11, but it has another value, because of the increased velocity and the corresponding counter-electromotive voltage. Very soon there is established reciprocation with a predetermined compression in the cylinders, amplitude, and reciprocation rate resp. frequency. These are the parameters of the starting operation conditions. The electrical energy consumed covers the losses of the pumping process as well as certain mechanical and electrical losses.

The ignition of the fuel-air mixture is accomplished by an electrical spark produced by the plugs 13 at the lowest possible compression ratio that is sufficient for the ignition of the gas mixture (on the order of 4 to 1 to 9 to 1 depending on the type and the quality of the fuel). The ignition point is regulated in a manner which depends upon the type and quality of the fuel and the charging of the generator. The combustion in each of the combustion chambers 4, 5 proceeds at a decreasing volume under the action of the forces produced by the opposite combustion chamber resp. 5 or 4 and the electromotive force of the coreless coil 9. At the end of the stroke of pistons 1 and 2 there are obtained high compressions on the order of over 100 atmospheres and high compression ratios on the order of over 25 to 1 which, however, do not cause a detonation combustion because of the great anticipation of the moment of ignition. The combustion process is terminated definitively at an expanding volume, i.e. during the reverse stroke of piston 1 or 2, whereby a complete combustion of the fuel mixture is ensured independently of the high speed of linear movement of the reciprocating system.

If the combustion process begins with the filling of the cylinders with a fuel-air mixture which, after having been burned, could supply energy necessary for the starting process, then there are obtained the same compressions, amplitude and reciprocation rate without, however, electrical starting impulses. In this case, the electronic control block 12 receives information about the increase in the electromotive voltage generated in coil 9 and automatically interrupts its action as a generator of electric bipolar starting impulses, whereby the transducers retain their controlling function only with respect to the transmitting of ignition sparks. Every greater filling with fuel mixture augments the amplitude and the rate of reciprocation, whereby as a result of the energy feed-back between the combustion processes in cylinders 4 and 5, combustion begins to proceed along with each following stroke at always smaller volumes and at higher pressures. In the case of idle running, this feed-back is so profound that theoretically it could lead to the self-destruction of the device. In order to avoid this undesired phenomenon, there are employed respective preventive high-pressure valves and the device is to be loaded uniformly, whereby the generated electrical voltage in coil 9 is led off to an outer load in the form of electric current.

After the initial ignition, the rate of the reciprocating system 1, 2, 3, and 9 increases rapidly, not only as a mean value but it becomes constant or nearly constant during the entire strokes of pistons 1 and 2 at their extreme outer points and inversely (FIG. 2). At the end of its stroke, the reciprocating system abruptly changes the direction of its movement. The small mass of the reciprocating system warrants a high rate of reciprocation, resp. frequency. The maximum possible rate of reciprocation is limited only by the fuel feeding mechanism and by the speed of the flame combustion fronts in the cylinders 4, 5.

The increase in the rate of reciprocation leads to the respective augmentation of the counter-electromotive force in coil 9, and as a result the starting current transmitted to it decreases. After the current passes its zero value, the control block 12 re-switches the coil 9 from its driving duty to its generator duty.

The constant (equilibrium) operation conditions denoted by "c" in FIG. 2 take place in the case when the led-off electrical energy equals the kinetic energy produced by the combustion process, while the rate of reciprocation is set up according to the pre-selected value. The generated electrical voltage possesses a frequency equal to the frequency of reciprocation of coil 9, while the electrical losses are low because of the rectangular form of the current and the absence of a movable iron core.

If for some reason for instance, perturbations in the combustion or over-loading, the rate of reciprocation falls below a certain limit, then the control block 12 again transmits impulses and the coil 9 is temporarily switched to driving duty. The re-switching of coil 9 from its driving duty to its generator duty and inversely, as well as the accumulating of energy from the previous stroke for the subsequent strokes, stabilizes the movement and plays the role of a flywheel without mass.

The combustion process beginning with a relatively low compression ratio and an end piston position corresponding to a high compression ratio (on the order of 20 to 1 to 30 to 1) considerably reduces the tendency of the device to stopping, thus warranting the accomplishment of more than one omitted idle stroke (combustion is failing). This action could be called a "pneumatic flywheel". The electronic control device ensures on its part a secure maintenance of the reciprocations in the case of greater omissions in the combustion, or of overloading, since the starting current impulses are automatically transmitted again in the case of each diminishing of the reciprocation rate resp. of the generated electrical voltage below a given value. This action could be called an "electronic flywheel".

The stopping of the device is performed most efficiently and securely by interrupting the fuel supply.

The amplitude-frequency characteristics $S = \delta(t)$ of an experimental device operating in accordance with the abovedescribed method is depicted in FIG. 2. The first part of the starting oscillation wave is denoted by "a", the further reciprocation up to the moment of the starting of the combustion process is denoted by "b", the constant operation conditions are denoted by "c", and the switching-off with a fading reciprocation of the accumulated compression energy by "d". The constancy of the rate of reciprocation with respect to the chosen absolute value, and the abrupt change in its direction at the extreme or end points can readily be seen.

The experimental device is constructed in such a manner that the end pressures do not attain the limiting possibilities of the method. Nevertheless, in the oscillogram in FIG. 2 there is illustrated an operation wherein a frequency of reciprocation F=230 Hz, the amplitude of reciprocation is 45 mm, and the compression ratio $\epsilon=16.2$. The linear rate of travel of the reciprocating system surpasses 20 m/sec. Equating the above values to the speed of revolution of a conventional type piston engine with a crank-connecting rod mechanism, the above data would correspond to 13,800 revolutions per minute of such conventional engine.

Although the invention is described and illustrated with reference to a preferred embodiment thereof, it is to be expressly understood that it is in no way limited to such preferred embodiment but is capable of numerous modification within the scope of the appended claims.

We claim:

1. A device for producing electrical energy from a cyclic combustion process, comprising two oppositely disposed aligned spark ignited internal combustion engine cylinders axially spaced from each other, a piston in each of the cylinders, means rigidly connecting the pistons so that they reciprocate in unison in their respective cylinders, means for alternately firing the two cylinders so as to reciprocate the piston system composed of the two pistons and the connecting means, a reciprocatory electrical generator-motor means driven by said reciprocatory piston system, said generator-motor means comprising a coil rigidly attached to and reciprocating with the said piston system and means creating a constant strength magnetic field within which the coil reciprocates, means to begin the combustion process in each combustion chamber at a low compression ratio sufficient for the initial ignition of the fuel-air mixture in transmitting an electric spark, to proceed at a diminishing volume under the influence of the opposite combustion chamber forces, and to terminate the combustion process at an expanding volume during the reverse piston stroke, whereby there is induced an electromotive voltage in the coil, a source of electrical current, and means which is switched on in the initial reciprocation of the piston system to energize the coil so that it drivingly reciprocates the piston system.

2. A device for producing electrical energy from a cyclic combustion process, comprising two oppositely disposed aligned spark ignited internal combustion engine cylinders axially spaced from each other, a piston in each of the cylinders, means rigidly connecting the pistons so that they reciprocate in unison in their respective cylinders, means for alternately firing the two cylinders so as to reciprocate the piston system composed of the two pistons and the connecting means, a reciprocatory electrical generator-motor means driven by said reciprocatory piston system, said generator-motor means comprising a coil rigidly attached to and reciprocating with the said piston system and means creating a constant strength magnetic field within which the coil reciprocates, means to begin the combustion process in each combustion chamber at a low compression ratio sufficient for the initial ignition of the fuel-air mixture in transmitting an electric spark, to proceed at a diminishing volume under the influence of the opposite combustion chamber forces, and to terminate the combustion process at an expanding volume during the reverse piston stroke, whereby there is induced an electromagnetic voltage in the coil, means for automatically re-switching the coil from its generator duty to its driving duty upon the diminishing of the rate of reciprocation of the piston system, and means for automatically re-switching the coil from its driving duty to its generator duty upon the restoring of the normal operating rate of reciprocation of the piston system.

3. A device for producing electrical energy from a cyclic combustion process, comprising two oppositely disposed aligned spark ignited internal combustion engine cylinders axially spaced from each other, a piston in each of the cylinders, means rigidly connecting the piston so that they reciprocate in unison in their respective cylinders, means for alternately firing the two cylinders so as to reciprocate the piston system composed of the two pistons and the connecting means, a reciprocatory electrical generator-motor means driven by said reciprocatory piston system, said generator-motor means comprising a coil rigidly attached to and reciprocating with the said piston system and means creating a constant strength magnetic field within which the coil reciprocates, means to begin the combustion process in each combustion chamber at a low compression ratio sufficient for the initial ignition of the fuel-air mixture in transmitting an electric spark, to proceed at a diminishing volume under the influence of the opposite combustion chamber forces, and to terminate the combustion process at an expanding volume during the reverse piston stroke, whereby there is induced an electromotive voltage in the coil, means for presetting the rate of reciprocation of the piston system, and means for maintaining the rate of reciprocation of the piston system at a constant value by equalizing the input and output power.

4. A device for producing electrical energy from a cyclic combustion process comprising two oppositely disposed aligned spark ignited internal combustion engine cylinders axially spaced from each other, a piston in each of the cylinders, means rigidly connecting the pistons so that they reciprocate in unison in their respective cylinders, means for alternately firing the fuel-air mixture in the two cylinders so that the resulting forces reciprocate the piston system composed of the two pistons and the connecting means, a reciprocatory linear electric generator-motor means driven by said reciprocatory piston system said generator-motor means comprising a coreless coil with very low mass characteristics, said coil rigidly attached to and reciprocating with the said piston system, and means creating a constant strength magnetic flux field within which the coil reciprocates, means to initiate the combustion process in each combustion chamber at the lowest possible compression ratio sufficient for the initial ignition of the fuel-air mixture in transmitting an electrical spark, causing the combustion to proceed at a diminishing volume under the pressure forces from the compression-combustion process develop in the opposite chamber, the combustion process terminating at an expanding volume during the reverse piston stroke of said piston systems, said piston systems beginning to reciprocate mechanically, whereby there is generated an electromotive voltage in the coil.

5. A method of producing electrical energy from a cyclic combustion process which employ a device comprising two oppositely disposed aligned spark ignited internal combustion engine cylinders axially spaced from each other, a piston in each of the cylinders, means rigidly connecting the pistons so that they reciprocate in unison in their respective cylinders, means for alternately firing the two cylinders so as to reciprocate the piston system composed of the two pistons and the connecting means, a reciprocatory electrical generator-motor means driven by said reciprocatory piston system, said generator-motor means comprising a coil rigidly attached to and reciprocating with the said piston system, and means creating a constant strength magnetic field within which the coil reciprocates, said method comprising beginning the combustion process in each combustion chamber at a low compression ratio sufficient for the initial ignition of the fuel-air mixture in transmitting an electric spark, causing said combustion to proceed at a diminishing volume under the influence of the opposite combustion chamber forces, and terminating the combustion process at an expanding volume during the reverse piston stroke, whereby there is induced an electromotive voltage in the coil, the device having a source of electrical current, and means selectively to energize the coil, the method comprising switching-on the last named means, in the initial reciprocation of the piston system to energize the coil so that it drivingly reciprocates the piston system.

6. A method of producing electric energy from a cyclic combustion process according to claim 5, comprising automatically re-switching the coil from its generator duty to its driving duty upon the diminishing of the rate of reciprocation of the piston system, and automatically re-switching the coil from its driving duty to its generator duty upon the restoring of the normal operating rate of reciprocation of the piston system.

7. A method of producing electrical energy from a cyclic combustion process which employ a device comprising two oppositely disposed aligned spark ignited internal combustion engine cylinders axially spaced from each other, a piston in each of the cylinders, means rigidly connecting the pistons so that they reciprocate in unison in their respective cylinders, means for alternately firing the two cylinders so as to reciprocate the piston system composed of the two pistons and the connecting means, a reciprocatory electrical generator-motor means driven by said reciprocatory piston system, said generator-motor means comprising a coil rigidly attached to and reciprocating with the said piston system, and means creating a constant strength magnetic field within which the coil reciprocates, said method comprising beginning the combustion process in each combustion chamber at a low compression ratio sufficient for the initial ignition of the fuel-air mixture in transmitting an electric spark, causing said combustion to proceed at a diminishing volume under the influence of the opposite combustion chamber forces, and terminating the combustion process at an expanding volume during the reverse piston stroke, whereby there is induced an electromotive voltage in the coil, and comprising presetting the rate of reciprocation of the piston system, and maintaining the rate of reciprocation of the piston system at a constant value by equalizing the input and output power.

8. A method of producing electrical energy from a cyclic combustion process according to claim 1, comprising operating the device at frequencies on the order of 200–300 Hz and more and high linear reciprocation velocity in the range about 20 m/s, which is on the same order as the propagation speed of the flames in the combustion chambers, maintaining this velocity at a constant level during the whole reciprocation cycle, whereby to enable a combustion process beginning at a compression ratio of 3 to 9 at the initial piston movement toward an upper extreme point and reverse movement of said piston after reaching this extreme point at which or shortly thereafter high pressures up to 100 atmospheres and more are obtained, these high pressures on their part maintaining reciprocation speed the needed for this specific combustion process, such reciprocation speed being on the same order as the propagation speed of the flames in the ignited fuel-air mixture, in the cylinders whereby these combustion and compression processes taking place reversibly in the respective cylinder-piston system work under a controlled positive feedback relation, which permits said high linear reciprocation velocity, respectively, high frequency of reciprocation of the piston system and the coil rigidly attached thereto.

* * * * *